United States Patent
Byun (10) Patent No.: US 8,846,241 B2
(45) Date of Patent: *Sep. 30, 2014

(54) RECHARGEABLE BATTERY

(71) Applicants: Samsung SDI Co., Ltd., Yongin-si (KR); Robert Bosch GmbH, Stuttgart (DE)

(72) Inventor: Sangwon Byun, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,894

(22) Filed: Jul. 1, 2013

(65) Prior Publication Data

US 2013/0288088 A1    Oct. 31, 2013

Related U.S. Application Data

(63) Continuation of application No. 13/032,452, filed on Feb. 8, 2011, now Pat. No. 8,501,341.

(60) Provisional application No. 61/360,258, filed on Jun. 30, 2010.

(51) Int. Cl.
    *H01M 2/26*    (2006.01)

(52) U.S. Cl.
    USPC .......................... 429/161; 429/163; 429/164

(58) Field of Classification Search
    None
    See application file for complete search history.

(56) References Cited

U.S. PATENT DOCUMENTS

| | | |
|---|---|---|
| 4,879,187 A | 11/1989 | Biegger |
| 5,158,842 A | 10/1992 | McHenry |
| 5,604,051 A * | 2/1997 | Pulley et al. ................... 429/99 |
| 5,798,906 A | 8/1998 | Ando et al. |
| 6,342,826 B1 | 1/2002 | Quinn et al. |
| 6,858,343 B2 | 2/2005 | Wang |

(Continued)

FOREIGN PATENT DOCUMENTS

| | | |
|---|---|---|
| CN | 1725525 A | 1/2006 |
| EP | 0 313 405 A1 | 4/1989 |

(Continued)

OTHER PUBLICATIONS

SIPO Office action dated Jul. 23, 2013, with English translation, for corresponding Chinese Patent application 201110100496.6, (17 pages).

European Search Report dated Aug. 1, 2011, for corresponding European Patent application 11158033.8, 7 pages.

(Continued)

*Primary Examiner* — Cynthia K. Walls
(74) *Attorney, Agent, or Firm* — Christie, Parker & Hale, LLP (57) ABSTRACT

A rechargeable battery including a collector plate having a fuse hole and a fuse protrusion, increasing the reliability of the fuse hole in view of its functionality as a fuse while strengthening a section where the fuse hole is formed, thereby improving safety of the rechargeable battery. A rechargeable battery includes an electrode assembly including a first electrode plate, a second electrode plate, and a separator between the first electrode plate and the second electrode plate; a case containing the electrode assembly; and a collector plate electrically connected to the first electrode plate and including a fuse portion including a fuse hole formed therein and a fuse protrusion extending from a first side of the fuse portion adjacent a first end of the fuse hole.

17 Claims, 6 Drawing Sheets

(56) References Cited

U.S. PATENT DOCUMENTS

| | | |
|---|---|---|
| 2003/0077484 A1 | 4/2003 | Cho |
| 2004/0126650 A1 | 7/2004 | Kim |
| 2006/0019158 A1* | 1/2006 | Mori et al. ............ 429/174 |
| 2006/0019159 A1 | 1/2006 | Mori et al. |
| 2007/0160904 A1 | 7/2007 | Uh |
| 2009/0305126 A1 | 12/2009 | Choi et al. |
| 2010/0247989 A1 | 9/2010 | Kim |
| 2011/0183193 A1 | 7/2011 | Byun et al. |
| 2011/0300419 A1 | 12/2011 | Byun |

FOREIGN PATENT DOCUMENTS

| | | | | |
|---|---|---|---|---|
| EP | 1 059 687 A2 | | 12/2000 | |
| EP | 2 273 587 A1 | | 1/2011 | |
| EP | 2 287 942 A1 | | 2/2011 | |
| EP | 2 393 145 A1 | | 12/2011 | |
| JP | 01-122560 A | | 5/1989 | |
| JP | 08-185850 | | 7/1996 | |
| JP | 10-188946 | | 7/1998 | |
| JP | 11-204006 | | 7/1999 | |
| JP | 2001-084880 | | 3/2001 | |
| JP | 2001-148239 | * | 5/2001 | ............ H01M 2/26 |
| JP | 2003-178745 | | 6/2003 | |
| JP | 2003-187760 | | 7/2003 | |
| JP | 2003-331815 A | | 11/2003 | |
| JP | 2004-119383 | | 4/2004 | |
| JP | 2005-142026 | | 6/2005 | |
| JP | 2005-259574 | * | 9/2005 | ............ H01M 2/30 |
| JP | 2005-259574 A | | 9/2005 | |
| JP | 2005-267945 A | | 9/2005 | |
| JP | 2007-188884 | | 7/2007 | |
| JP | 2007-266000 | | 10/2007 | |
| JP | 2008-218132 | | 9/2008 | |
| JP | 2009-535777 | | 10/2009 | |
| JP | 2011-154991 | | 8/2011 | |
| KR | 10-0693115 B1 | | 3/2007 | |
| KR | 10-2010-0108854 | | 10/2010 | |

OTHER PUBLICATIONS

European Search Report dated Nov. 4, 2010, for European Patent application 10171704.9, (5 pages).
European Office action dated Apr. 16, 2012, for European Patent application 10171704.9, (3 pages).
Korean Notice of Allowance dated May 4, 2011, for Korean Patent application 10-2010-0007049, (5 pages).
Patent Abstracts of Japan, and English machine translation of Japanese publication 11-204006, (8 pages).
Patent Abstracts of Japan, and English machine translation of Japanese publication 2007-266000, (12 pages).
Patent Abstracts of Japan, and English machine translation of Japanese publication 2008-218132, (9 pages).
KIPO Office action dated Jul. 24, 2012, for corresponding Korean Patent application 10-2011-0017597, (3 pages).
Patent Abstracts of Japan, and English machine translation of Japanese Publication 2001-148239 listed above, (6 pages).
Patent Abstracts of Japan, and English machine translation of Japanese Publication 2005-142026 listed above, (15 pages).
Japanese Office action dated Sep. 18, 2012, for Japanese Patent application 2010-154420, (2 pages).
Patent Abstracts of Japan, and English machine translation of Japanese Publication 08-185850 listed above, (11 pages).
Patent Abstracts of Japan, and English machine translation of Japanese Publication 2003-187760 listed above, (8 pages).
Office action issued in U.S. Appl. No. 12/817,115, filed Jun. 16, 2010, inventor Sangwon Byun, Office action mailed Aug. 8, 2012 (14 pgs.).
KIPO Notice of Allowance dated Jan. 15, 2013, for corresponding Korean Patent application 10-2011-0017597, (5 pages).
JPO Office action dated Apr. 30, 2013, for corresponding Japanese Patent application 2011-116948, (2 pages).
Patent Abstracts of Japan, and English machine translation of Japanese Publication 10-188946, dated Jul. 21, 1998, listed above, (8 pages).
U.S. Office Action dated Dec. 26, 2012, for U.S. Appl. No. 12/817,115 (9 sheets).

\* cited by examiner

RECHARGEABLE BATTERY

CROSS-REFERENCE TO RELATED APPLICATION

This application is a continuation of U.S. patent application Ser. No. 13/023,452, filed on Feb. 8, 2011, which claims priority to and the benefit of U.S. Provisional Patent Application No. 61/360,258, filed on Jun. 30, 2010 in the United States Patent and Trademark Office, the entire content of each of which is incorporated herein by reference.

BACKGROUND

1. Field

Aspects of embodiments of the present invention relate to a rechargeable battery.

2. Description of the Related Art

Unlike a primary battery, a rechargeable battery may be repeatedly charged and discharged. Low capacity batteries having a single battery cell packaged in a pack type are used for various portable electronic devices, such as cellular phones or camcorders. High capacity batteries are used as the power source for motor drives, such as in hybrid electric vehicles.

Rechargeable batteries may be classified into different types, for example, cylindrical batteries and prismatic batteries. The rechargeable battery is generally constructed by accommodating an electrode assembly having a positive electrode and a negative electrode with a separator as an insulator interposed therebetween in a case together with an electrolyte, and connecting a cap assembly having electrode terminals to the case.

When excessive heat is generated or an electrolyte is decomposed in a battery, the internal pressure of the battery may rise, resulting in explosion and fire. Accordingly, there is a need for a rechargeable battery configured to improve reliability.

SUMMARY

According to an aspect of embodiments of the present invention, a rechargeable battery includes a collector plate having a fuse hole and a fuse protrusion, which increases the reliability of the fuse hole in view of its functionality as a fuse while strengthening a fuse hole section, thereby improving safety of the rechargeable battery.

According to an embodiment of the present invention, a rechargeable battery includes: an electrode assembly including a first electrode plate, a second electrode plate, and a separator between the first electrode plate and the second electrode plate; a case containing the electrode assembly; and a collector plate electrically connected to the first electrode plate and including a fuse portion including a fuse hole formed therein and a fuse protrusion extending from a first side of the fuse portion adjacent a first end of the fuse hole.

In one embodiment, the fuse protrusion is bent at an angle relative to a surface of the fuse portion having the fuse hole formed therein.

In one embodiment, a cross-sectional area of the fuse portion where the fuse hole is formed is smaller than that of other portions of the collector plate.

A rechargeable battery may further include an electrode terminal electrically connected to the first electrode plate. The collector plate may further include a connection part coupled to the electrode terminal, and an extension part extending from the connection part and coupled to the first electrode plate. In one embodiment, the connection part has a terminal hole formed therein, and the connection part is coupled to the electrode terminal at the terminal hole. The connection part may include the fuse portion. In one embodiment, the extension part includes the fuse portion. In one embodiment, the extension part extends substantially perpendicularly from the connection part to form a corner portion of the collector plate, and the fuse portion is proximate the corner portion. A width of the extension part may be greater than a width of the connection part.

In one embodiment, a rechargeable battery further includes a cap assembly including a cap plate sealing an opening of the case, and at least one electrode terminal including the electrode terminal protrudes through a surface of the cap plate to the outside of the case. The fuse protrusion may be bent relative to a surface of the fuse portion having the fuse hole formed therein in a direction away from the surface of the cap plate. In one embodiment, the fuse protrusion is bent relative to a surface of the fuse portion having the fuse hole formed therein in a direction toward the surface of the cap plate.

In one embodiment, the electrode terminal is a first electrode terminal, and the rechargeable battery further includes a second electrode terminal electrically connected to the second electrode plate, and the collector plate is a first collector plate, the fuse portion is a first fuse portion, the fuse hole is a first fuse hole, the fuse protrusion is a first fuse protrusion, and the rechargeable battery further includes a second collector plate coupled between and electrically connecting the second electrode plate and the second electrode terminal, the second collector plate including a second fuse portion including a second fuse hole formed therein and a second fuse protrusion extending from a side of the second fuse portion adjacent the second fuse hole.

The fuse portion may further includes another fuse protrusion extending from a second side of the fuse portion adjacent a second end of the fuse hole opposite the first end. The fuse hole may be elongated in a widthwise direction extending toward the fuse protrusion. In one embodiment, a distance between the first end of the fuse hole and the first side of the fuse portion from which the fuse protrusion extends is about 1 mm to about 5 mm. The fuse protrusion may have a groove formed at a side thereof.

According to an aspect of embodiments of the present invention, a rechargeable battery includes a collector plate having a fuse hole and a fuse protrusion, thereby strengthening a section where the fuse hole is formed and increasing a duration of time in which a current flows through the fuse protrusion by allowing the current to detour to the fuse protrusion when an electrical short-circuit occurs.

According to another aspect of embodiments of the present invention, in a rechargeable battery in which an electrical short-circuit has not occurred, the fuse protrusion prevents or reduces warping or damage of the section where the fuse hole is formed due to external shock such that the fuse hole does not lose its functionality as a fuse.

BRIEF DESCRIPTION OF THE DRAWINGS

The above and other features and advantages will become more apparent to those of ordinary skill in the art by describing in detail some exemplary embodiments of the present invention with reference to the attached drawings. Moreover, additional aspects and/or advantages of embodiments of the present invention are set forth in the following description and accompanying drawings, or may be obvious in view thereof to those skilled in the art.

Description of Reference Numerals Indicating Some Elements in the Drawings

| | |
|---|---|
| 10: Electrode Assembly | 20, 20', 120, 220: First Collector Plate |
| 25, 125: First Fuse Hole | 26, 26', 126, 226: First Fuse Protrusion |
| 30, 130: Second Collector Plate | 40: Case |
| 50: Cap Assembly | 60: First Short-Circuit Plate |
| 61: Second Short-Circuit Plate | 100, 200: Rechargeable Battery |

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. Like reference numerals designate like elements throughout the specification and drawings.

Figure 1:
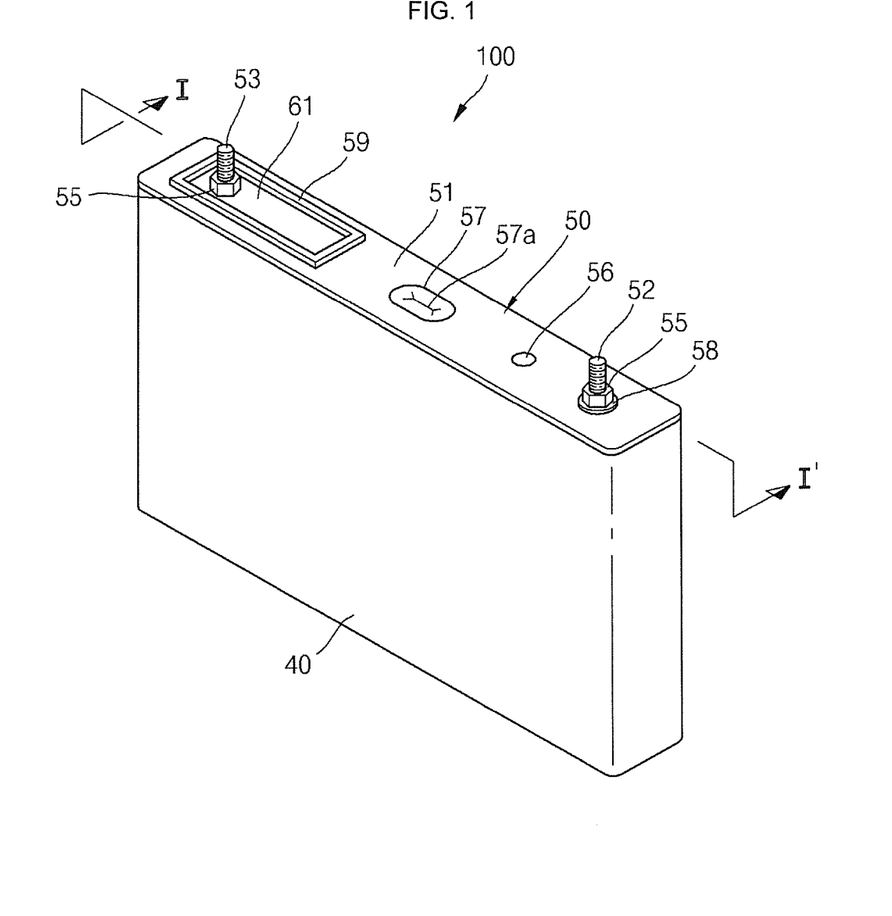
FIG. 1 is a perspective view of a rechargeable battery according to an embodiment of the present invention.
Figure 2:
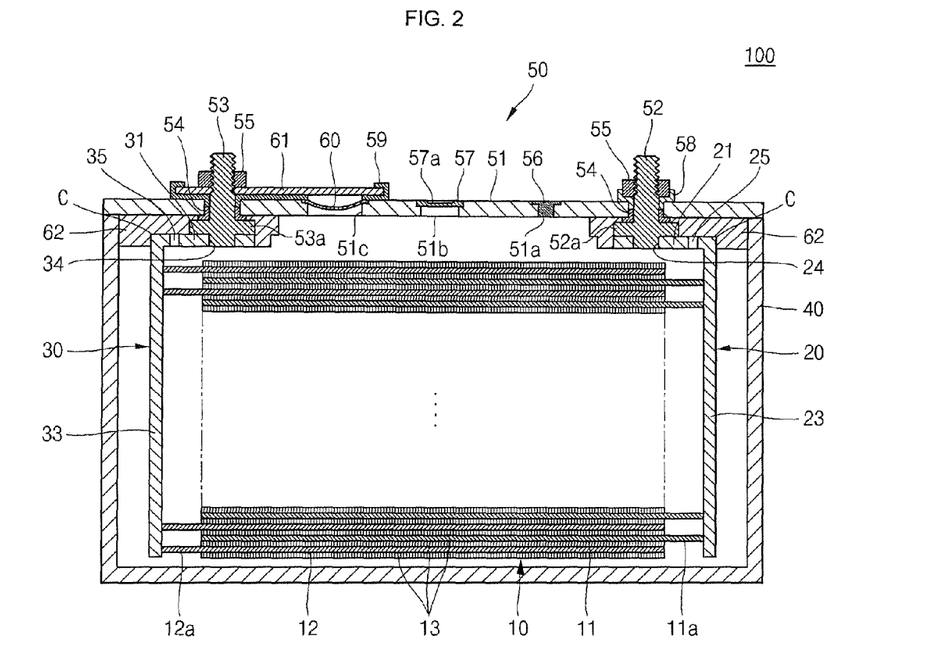
FIG. 2 is a cross-sectional view of the rechargeable battery of FIG. 1, taken along the line I-I'.
Figure 3A:
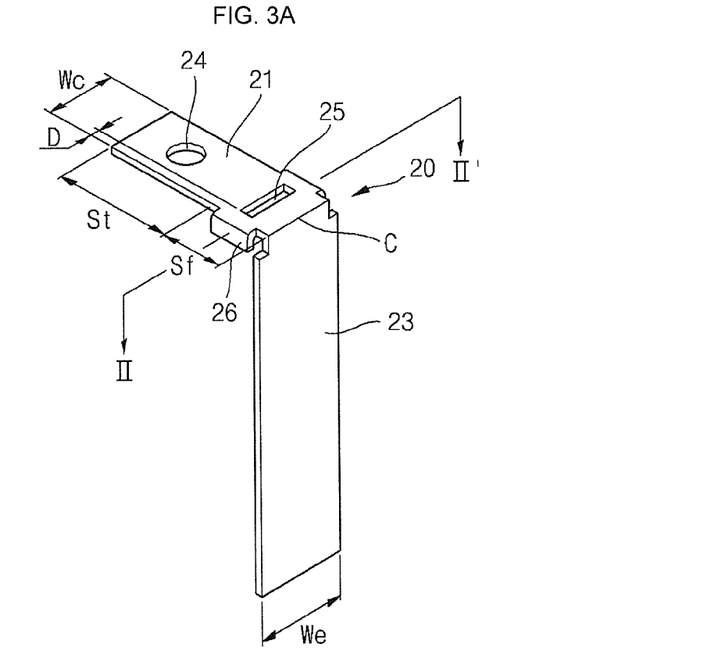
FIG. 3A is a perspective view of a collector plate of the rechargeable battery of FIG. 1.
Figure 3B:
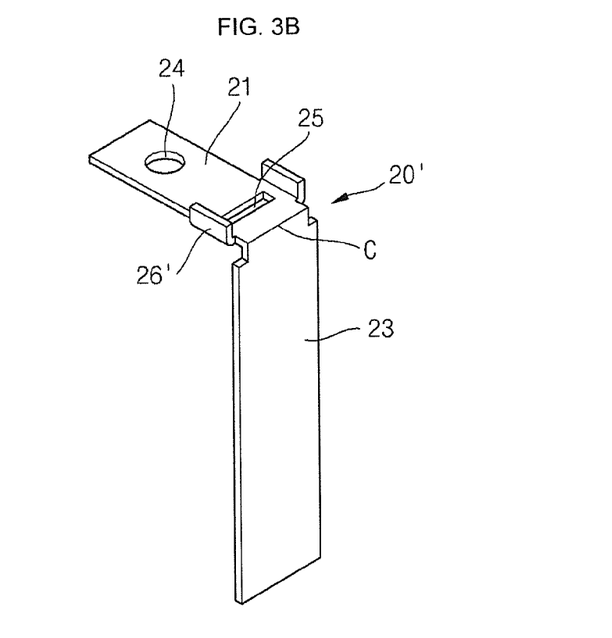
FIG. 3B is a perspective view of a collector plate of a rechargeable battery according to another embodiment of the present invention.
Figure 4:
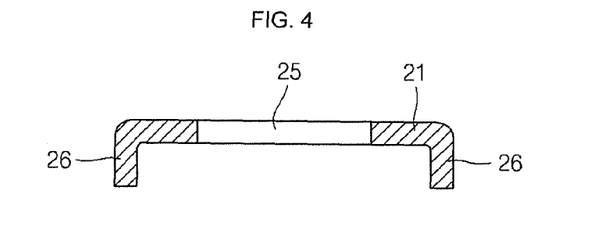
FIG. 4 is a cross-sectional view of the collector plate of FIG. 3A, taken along the line II-II'.
Figure 5:
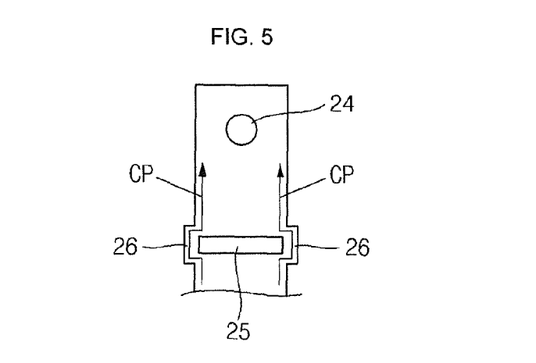
FIG. 5 is a partial plan view of the collector plate of FIG. 3A.

FIG. 1 is a perspective view of a rechargeable battery 100 according to an embodiment of the present invention; FIG. 2 is a cross-sectional view of the rechargeable battery 100, taken along the line I-I' of FIG. 1; FIG. 3A is a perspective view of a collector plate of the rechargeable battery 100; FIG. 4 is a cross-sectional view of the collector plate of FIG. 3A, taken along the line II-II'; and FIG. 5 is a partial plan view of the collector plate of FIG. 3A. FIG. 3B is a perspective view of a collector plate of a rechargeable battery according to another embodiment of the present invention.

Referring to FIGS. 1 and 2, the rechargeable battery 100 includes an electrode assembly 10, a first collector plate 20, a second collector plate 30, a case 40, and a cap assembly 50.

The electrode assembly 10 is formed by spirally winding or stacking a stacked structure including a first electrode plate 11 shaped of a thin plate or film, a separator 13, and a second electrode plate 12. In one embodiment, the first electrode plate 11 serves as a positive electrode and the second electrode plate 12 serves as a negative electrode.

The first electrode plate 11, in one embodiment, is formed by coating a first electrode active material, such as a transition metal oxide, on a first electrode collector made of a metal foil such as aluminum, and includes a first electrode uncoated portion 11a on which the first electrode active material is not coated. The first electrode uncoated portion 11a provides a current flow path between the first electrode plate 11 and the outside of the first electrode plate 11. The material of the first electrode plate 11 is not limited to the specific material listed herein.

The second electrode plate 12 is formed by coating a second electrode active material, such as a graphite or carbon, on a second electrode collector made of a metal foil such as nickel or copper, and includes a second electrode uncoated portion 12a on which the second electrode active material is not coated. The second electrode uncoated portion 12a provides a current flow path between the second electrode plate 12 and the outside of the second electrode plate 12. The material of the second electrode plate 12 is not limited to the specific material listed herein.

Polarities of the first electrode plate 11 and the second electrode plate 12 may be reversed. That is, in another embodiment, the first electrode plate 11 serves as a negative electrode and the second electrode plate 12 serves as a positive electrode.

The separator 13, positioned between the first and second electrodes 11 and 12, prevents or substantially prevents an electrical short-circuit therebetween and allows movement of lithium ions. The separator 13 may be made of polyethylene, polypropylene, or a composite film of polyethylene and polypropylene. However, the material of the separator 13 is not limited to the specific material listed herein.

The first collector plate 20 and the second collector plate 30 are coupled to both ends of the electrode assembly 10 to be electrically connected to the first electrode plate 11 and the second electrode plate 12, respectively.

The first collector plate 20 is formed of a conductive material, such as aluminum, and contacts the first electrode uncoated portion 11a protruding to one end of the electrode assembly 10 to be electrically connected to the first electrode plate 11. Referring to FIGS. 2 and 3A, in one embodiment, the first collector plate 20 includes a first connection part 21, a first extension part 23, a first terminal hole 24, a first fuse hole 25, and a first fuse protrusion 26.

The first connection part 21 is provided between an upper portion of the electrode assembly 10 and a lower portion of the cap assembly 50, and has a plate shape. The first connection part 21 has a first connection part width Wc. Here, the first connection part 21 may be defined by a first terminal section St providing an area where the first terminal hole 24 is formed, and a first fuse section Sf providing an area where the first fuse hole 25 is formed.

The first extension part 23 is bent relative to the first connection part 21 and extends from an end of the first connection part 21 and is formed in a plate shape contacting the first electrode uncoated portion 11a. In addition, the first extension part 23, in one embodiment, has a first extension part width We that is greater than the first connection part width Wc. Herein, a corner at which the first connection part 21 and the first extension part 23 meet is referred to as 'C.' In one embodiment, the first connection part 21 and the first extension part 23 are perpendicular to each other about the corner C. The first connection part width Wc may be smaller than the first extension part width We to allow internal gases of the rechargeable battery 100 to easily move toward a vent plate 57 opened when an internal pressure of the rechargeable battery 100 is greater than or equal to a predefined pressure.

The first terminal hole 24, in one embodiment, is formed at one side of the first connection part 21, that is, at the first terminal section St, and provides an opening in the first connection part 21 where a first electrode terminal 52 of the cap assembly 50 is inserted into and coupled to the first terminal hole 24. In the first connection part 21 according to one embodiment, the first terminal section St is positioned to be distal from the corner C.

The first fuse hole 25 and the first fuse protrusion 26 are positioned over the electrode assembly 10, that is, on the first fuse section Sf of the first connection part 21, so as not to make contact with an electrolyte. This is to prevent or substantially prevent the electrolyte from causing a fire due to heat generated from the first fuse section Sf where the first fuse hole 25 and the first fuse protrusion 26 are formed. In one embodiment, the first fuse section Sf is positioned in close proximity to the corner C of the first connection part 21, so that the first fuse hole 25 and the first fuse protrusion 26 do not overlap the first electrode terminal 52 coupled to the first terminal hole 24.

In one embodiment, the first fuse hole 25 is formed passing through the first connection part 21. The first fuse hole 25 allows a section where the first fuse hole 25 is formed to have a smaller cross-sectional area than other sections of the first collector plate 20. The first fuse hole 25 may have a square shape, for example, or a rectangular shape elongated in a widthwise direction of the first connection part 21, but the present invention is not limited thereto, and in other embodiments, the first fuse hole 25 may have any other suitable shape. Further, in one embodiment, the first fuse hole 25 may be configured as a recess in the first connection part 21 having a thickness less than that of other portions of the first connection part 21, rather than a hole passing through the first connection part 21. The first fuse hole 25 functions as a fuse that cuts off a flow of current by allowing the section where the first fuse hole 25 is formed to be melted by heat generated when an electrical short-circuit occurs to the rechargeable battery 100 and a large amount of current flows through the rechargeable battery 100. The electrical short-circuit may be caused by bringing a first short-circuit plate 60 and a second short-circuit plate 61 into contact with each other when the rechargeable battery 100 is overcharged to generate heat or the internal pressure of the rechargeable battery 100 exceeds a predefined pressure due to decomposition of the electrolyte. Accordingly, the section where the first fuse hole 25 is formed is melted using the electrical short-circuit caused due to the overcharge of the rechargeable battery 100 to interrupt the current flow, thereby interrupting a charging or discharging operation of the rechargeable battery 100 to avoid risks, such as fire or explosion.

In one embodiment, the first fuse protrusion 26 is bent from an end of the first fuse section Sf and extends toward the electrode assembly 10. At least one of the first fuse protrusion 26 may be formed on either or both of the left or right side of the first fuse hole 25. The first fuse protrusion 26 is bent in the vicinity of the first fuse hole 25 and strengthens the section where the first fuse hole 25 is formed. Therefore, in a case where an electrical short-circuit does not occur to the rechargeable battery 100 due to low resistance of the section where the first fuse hole 25 is formed against external shocks, the first fuse protrusion 26 may prevent or substantially prevent the section where the first fuse hole 25 is formed from being warped or damaged due to the external shocks. In addition, the first fuse protrusion 26 forms a current path CP (see FIG. 5) together with the first connection part 21 and the first extension part 23. The first fuse protrusion 26 allows a current flowing between the first connection part 21 and the first extension part 23 to detour to the first fuse protrusion 26, thereby increasing a duration of time in which the current flows through a narrow area. Accordingly, the first fuse protrusion 26 allows a larger amount of heat to be generated due to the electrical short-circuit of the rechargeable battery 100, thereby increasing the reliability of the first fuse hole 25 in view of its functionality as a fuse. In the first fuse section Sf, a distance D between a starting portion of the first fuse protrusion 26 and the first fuse hole 25, in one embodiment, is approximately 1 mm to approximately 5 mm. When the distance D between the starting portion of the first fuse protrusion 26 and the first fuse hole 25 is less than 1 mm, the fuse functionality of the first fuse hole 25 may increase, suggesting that the strengthening capability of the first fuse protrusion 26 may be comparatively lowered. However, when the distance D between the starting portion of the first fuse protrusion 26 and the first fuse hole 25 is greater than 5 mm, the fuse functionality of the first fuse hole 25 may be lowered whereas the strengthening capability of the first fuse protrusion 26 may increase. In one embodiment, as shown in FIG. 3A, the first fuse protrusion 26 of the first collector plate 20 is bent and extends toward a lower side of the first collector plate 20, that is, toward the electrode assembly 10, to avoid interference between the first fuse protrusion 26 and other components of the cap assembly 50. However, the present invention is not limited thereto. For example, in another embodiment, as shown in FIG. 3B, a first fuse protrusion 26' of a first collector plate 20' is bent and extends toward an upper side of the first collector plate 20', that is, toward the cap assembly 50.

The second collector plate 30, in one embodiment, is formed of a conductive material, such as nickel or copper, and may be electrically connected to the second electrode plate 12 and contacting the second electrode uncoated portion 12a protruding to the other end of the electrode assembly 10. The second collector plate 30, in one embodiment, includes a second connection part 31, a second extension part 33, a second terminal hole 34, a second fuse hole 35, and a second fuse protrusion (not shown).

Since a configuration of the second collector plate 30 may be substantially the same as that of the first collector plate 20 shown in FIG. 3A, a descriptions thereof is not repeated herein. In one embodiment, the second collector plate 30 may not have the second fuse hole 35 and the second fuse protrusion corresponding to the first fuse hole 25 and the first fuse protrusion 26. That is, in one embodiment, because the first collector plate 20 has the first fuse hole 25 functioning as a fuse and since the first collector plate 20 is made of aluminum, for example, having a lower melting point than a material of the second collector plate 30, such as nickel or copper, the fuse functionality of the first collector plate 20 may be more easily realized than that of the second collector plate 30. However, in one embodiment, in a case where the first fuse hole 25 of the first collector plate 20 does not properly perform its functionality as a fuse, the second fuse hole 35 of the second collector plate 30 allows the fuse functionality to be maintained in the rechargeable battery 100 as a whole. Alternatively, the second collector plate 30 may include the second fuse hole 35 and the second fuse protrusion, and the first fuse hole 25 and the first fuse protrusion 26 are absent in the first collector plate 20.

The case 40, in one embodiment, is formed of a conductive metal such as aluminum, aluminum alloy, or nickel plated steel, and has a substantially prismatic shape having an opening in which the electrode assembly 10, the first collector plate 20 and the second collector plate 30 are inserted and positioned. Although FIG. 2 illustrates a state in which the case 40 and the cap assembly 50 are assembled and the opening is not illustrated, the opening corresponds generally to a peripheral portion of the cap assembly 50. In one embodiment, an internal surface of the case 40 is subjected to insulating treatment, so that it is insulated from the electrode assembly 10, the first collector plate 20, the second collector plate 30, and the cap assembly 50. The case 40 may have a polarity. That is, the case 40 may serve as a positive electrode, for example.

The cap assembly 50 is coupled to the case 40. In one embodiment, the cap assembly 50 includes a cap plate 51, a first electrode terminal 52, a second electrode terminal 53, a gasket 54, and a nut 55. The cap assembly 50 may further include a plug 56, a vent plate 57, a connection plate 58, an upper insulation member 59, the first short-circuit plate 60, the second short-circuit plate 61, and a lower insulation member 62.

The cap plate 51 seals the opening of the case 40 and may be made of the same material as the case 40. The cap plate 51 may have the same polarity as the case 40.

The first electrode terminal 52 passes through one side of the cap plate 51 and is electrically connected to the first collector plate 20. The first electrode terminal 52 may be shaped of a pillar, and a thread may be formed on the outer circumference of an upper part of the pillar exposed beyond the cap plate 51. A flange 52a may be formed on a lower part of the pillar located at the lower portion of the cap plate 51 to prevent or substantially prevent the first electrode terminal 52 from slipping away from the cap plate 51. In the first electrode terminal 52, part of the pillar positioned below the flange 52a is inserted into the first terminal hole 24 of the first collector plate 20. In one embodiment, the first electrode terminal 52 is electrically connected to the cap plate 51.

The second electrode terminal 53, in one embodiment, passes through the other side of the cap plate 51 and is electrically connected to the second collector plate 30. In one embodiment, the second electrode terminal 53 has substantially the same configuration as the first electrode terminal 52 except that the second electrode terminal 53 is insulated from the cap plate 51 and, therefore, a description thereof will not be repeated herein.

The gasket 54, in one embodiment, is formed between each of the first electrode terminal 52 and the second electrode terminal 53 and the cap plate 51 using an insulating material, and hermetically seals gaps between each of the first electrode terminal 52 and the second electrode terminal 53 and the cap plate 51. The gasket 54, in one embodiment, prevents external moisture from infiltrating into the rechargeable battery 100 or an electrolyte contained inside the rechargeable battery 100 from flowing out.

The nut 55 is engaged with the thread formed on each of the first electrode terminal 52 and the second electrode terminal 53 and fixes the first electrode terminal 52 and the second electrode terminal 53 to the cap plate 51, respectively. The plug 56 seals an electrolyte injection hole 51a of the cap plate 51. The vent plate 57 is provided in the vent hole 51b of the cap plate 51 and includes a notch 57a configured to be opened at a predefined pressure.

In one embodiment, the connection plate 58 is formed to be inserted into a space between the first electrode terminal 52 and the cap plate 51 and closely contacts the cap plate 51 and the gasket 54 under the nut 55. The connection plate 58, in one embodiment, electrically connects the first electrode terminal 52 and the cap plate 51 to each other.

The upper insulation member 59, in one embodiment, is formed to be inserted into a space between the second electrode terminal 53 and the cap plate 51 and closely contacts the cap plate 51 and the gasket 54. The upper insulation member 59 insulates the second electrode terminal 53 and the cap plate 51 from each other.

In a short-circuit hole 51c of the cap plate 51, the first short-circuit plate 60 is disposed between the upper insulation member 59 and the cap plate 51. The first short-circuit plate 60, in one embodiment, is an inverted plate having a rounded portion that is downwardly convex and an edge portion fixed to the cap plate 51. The first short-circuit plate 60 may be inverted to be upwardly convex when the internal pressure of the rechargeable battery 100 exceeds a predefined pressure due to overcharge of the rechargeable battery 100. The first short-circuit plate 60, in one embodiment, has the same polarity as the cap plate 51.

The second short-circuit plate 61, in one embodiment, is formed such that the second electrode terminal 53 is inserted from an exterior side spaced apart from the cap plate 51, that is, on the upper insulation member 59 and extends to cover the short-circuit hole 51c. The second short-circuit plate 61 is electrically connected to the second electrode terminal 53. The second short-circuit plate 61 comes into contact with the first short-circuit plate 60 that convexly protrudes upwardly when the internal pressure of the rechargeable battery 100 exceeds a predefined pressure due to overcharge of the rechargeable battery 100, thereby causing an electrical short-circuit to the rechargeable battery 100. When the electrical short-circuit is caused to the rechargeable battery 100, a large amount of current flows through the rechargeable battery 100 to generate heat. Here, the first fuse hole 25 or the second fuse hole 35 performs a fuse function, thereby improving the safety of the rechargeable battery 100.

The lower insulation member 62, in one embodiment, is disposed between each of the first collector plate 20 and the second collector plate 30 and the cap plate 51, and prevents an unnecessary electrical short-circuit from being caused to the rechargeable battery 100.

As described above, in the rechargeable battery 100 according to an embodiment of the present invention including the first collector plate 20 having the first fuse hole 25 and the first fuse protrusion 26 and/or the second collector plate 30 having the second fuse hole 35 and the second fuse protrusion, a strength of a section where the first fuse hole 25 or the second fuse hole 35 is formed is reinforced. When an electrical short-circuit occurs to the rechargeable battery 100, a duration of time in which a current flows through the first fuse protrusion 26 or the second fuse protrusion is increased by allowing the current to detour to the first fuse protrusion 26 or the second fuse protrusion.

If no electrical short-circuit has occurred to the rechargeable battery according to the embodiment of the present invention, the first fuse hole 25 can be prevented or substantially prevented from losing its functionality as a fuse by preventing or reducing warping or damage of the section where the first fuse hole 25 or the second fuse hole 35 is formed due to external shocks. Once an electrical short-circuit occurs, the reliability of the first fuse hole 25 or the second fuse hole 35 is increased in view of its functionality as a fuse, thereby improving the safety of the rechargeable battery 100.

A rechargeable battery according to another embodiment of the present invention will now be described.

Figure 6:
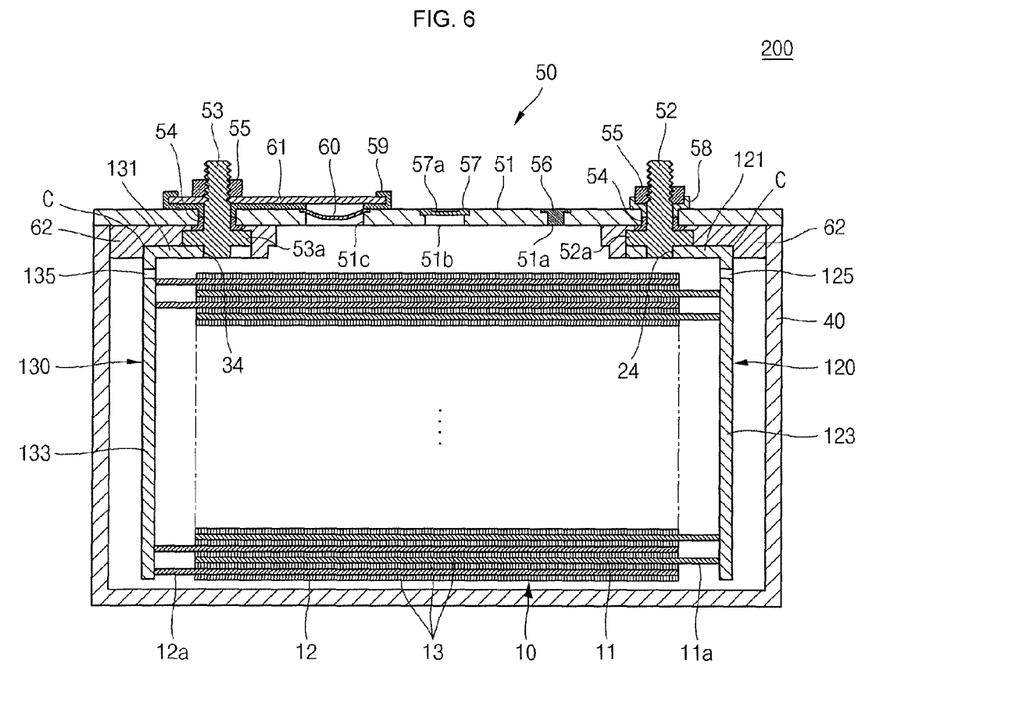
FIG. 6 is a cross-sectional view of a rechargeable battery according to another embodiment of the present invention.
Figure 7:
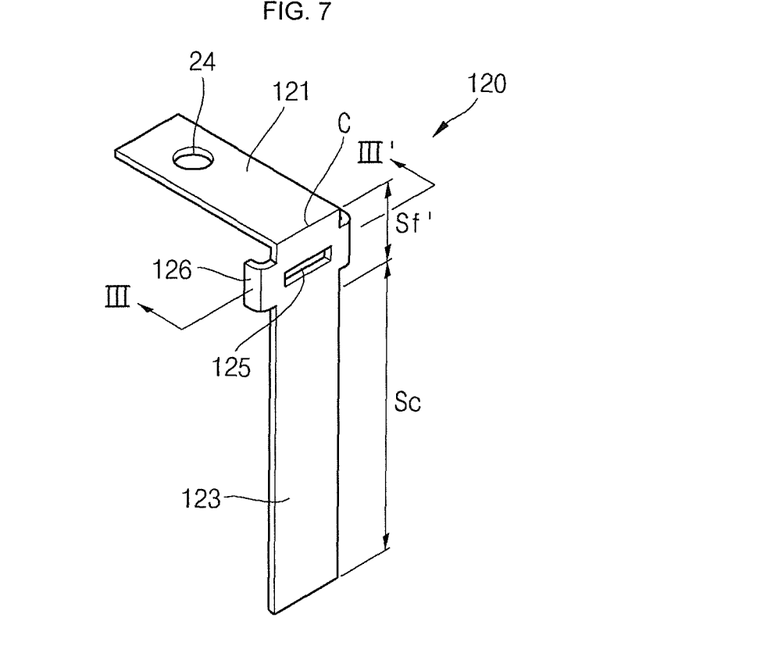
FIG. 7 is a perspective view of a collector plate of the rechargeable battery of FIG. 6.

FIG. 6 is a cross-sectional view of a rechargeable battery 200 according to another embodiment of the present invention; FIG. 7 is a perspective view of a collector plate of the rechargeable battery 200; and FIG. 8 is a cross-sectional view of the collector plate of FIG. 7, taken along the line III-III'.

Configurations and functions of the rechargeable battery 200, in one embodiment, are substantially the same as those of the rechargeable battery 100 described above, except that locations of a first fuse hole 125 and a first fuse protrusion 126 of a first collector plate 120 and a second fuse hole 135 and a second fuse protrusion (not shown) of a second collector plate 130 are different from the locations of the corresponding components of the rechargeable battery 100 described above and, therefore, descriptions of same components will be omitted. In the following description, the rechargeable battery 200 will be described with emphasis on the first fuse hole 125 and the first fuse protrusion 126 of the first collector plate 120 and the second fuse hole 135 and the second fuse protrusion of the second collector plate 130.

Figure 8:
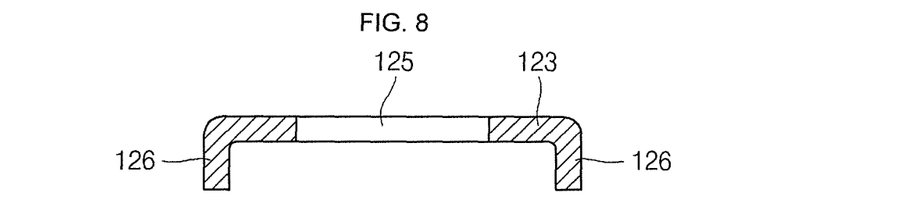
FIG. 8 is a cross-sectional view of the collector plate of FIG. 7, taken along the line III-III'.

Referring to FIGS. 6 through 8, the rechargeable battery 200 includes the electrode assembly 10, the first collector plate 120, the second collector plate 130, the case 40, and the cap assembly 50.

Referring to FIGS. 6 and 7, the first collector plate 120, in one embodiment, includes a first connection part 121, a first extension part 123, the first terminal hole 24, the first fuse hole 125, and the first fuse protrusion 126.

The first fuse hole 125 and the first fuse protrusion 126, in one embodiment, are substantially the same as the first fuse hole 25 and the first fuse protrusion 26, respectively, shown in FIGS. 2 and 3A, in view of their configurations and functions, except that the first fuse hole 125 and the first fuse protrusion 126 are formed on an upper portion of the first extension part 123 where contact with an electrolyte is prevented or substantially prevented, that is, on a first fuse section Sf in close proximity to the corner C. The first fuse protrusion 126, in one embodiment, is bent and extends toward the electrode assembly 10. Alternatively, the first fuse protrusion 126 may be bent and extending toward the case 40. A first contact section Sc in the first extension part 123 corresponds to an area that is in contact with the first electrode uncoated portion 11a.

The second collector plate 130, in one embodiment, includes a second connection part 131, a second extension part 133, the second terminal hole 34, the second fuse hole 135, and the second fuse protrusion (not shown). The second fuse hole 135 and the second fuse protrusion are substantially the same as the first fuse hole 125 and the first fuse protrusion 126, respectively, in view of their configurations and functions.

As described above, in the rechargeable battery 200, the first fuse hole 125 and the first fuse protrusion 126 are formed in the first extension part 123 of the first collector plate 120, and/or the second fuse hole 135 and the second fuse protrusion are formed in the second extension part 133 of the second collector plate 130, thereby preventing interference between the first fuse protrusion 126 and the cap assembly 50 or interference between the second fuse protrusion and the cap assembly 50.

A collector plate of a rechargeable battery according to another embodiment of the present invention will now be described.

Figure 9:
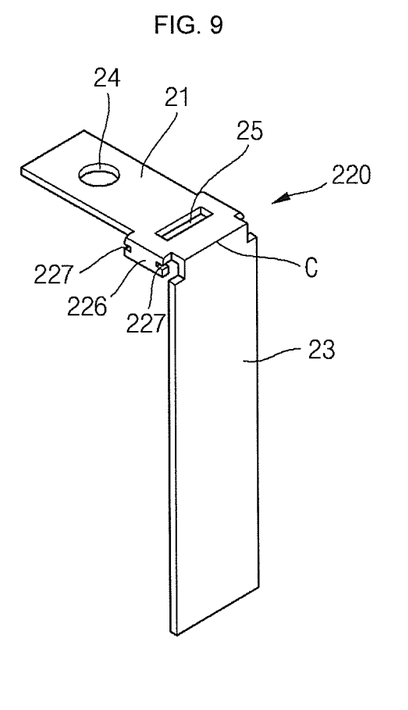
FIG. 9 is a perspective view of a collector plate of a rechargeable battery according to another embodiment of the present invention.

FIG. 9 is a perspective view of a collector plate of a rechargeable battery according to another embodiment of the present invention.

Configurations and functions of the rechargeable battery are substantially the same as those of the rechargeable battery 100 shown in FIG. 2, except that the configuration of a first fuse protrusion 226 of a first collector plate 220 is different from that of the first fuse protrusion 126 of the first collector plate 120 of the rechargeable battery 100 shown in FIG. 2, and, therefore, description of same components thereof will be omitted. In the following description, the rechargeable battery will be described with emphasis on the first fuse protrusion 226 of the first collector plate 220. Referring to FIG. 9, the first collector plate 220 may include the first connection part 21, the first extension part 23, the first terminal hole 24, the first fuse hole 25, and the first fuse protrusion 226.

The first fuse protrusion 226 is substantially the same as the first fuse protrusion 26 shown in FIG. 3A, except that the first fuse protrusion 226 further includes at least one first auxiliary groove 227 formed on its side surface. The first auxiliary groove 227 reduces a section where the first fuse protrusion 226 is formed without considerably lowering a strengthening function of the first fuse protrusion 226. Accordingly, the first auxiliary groove 227 may increase a duration of time in which a current flows through the section of the first fuse protrusion 226 that has become narrow when the current flowing through a path between the first connection part 21 and the first extension part 23 is allowed to detour to the first fuse protrusion 226. Accordingly, the first fuse protrusion 226 allows a larger amount of heat to be generated due to an electrical short-circuit of the rechargeable battery, thereby increasing the reliability of the first fuse hole 25 in view of its functionality as a fuse. Meanwhile, a second collector plate (not shown) may be formed to correspond to the first collector plate 220.

As described above, in the rechargeable battery according to another embodiment of the present invention, at least one first auxiliary groove 227 is formed on the first fuse protrusion 226, thereby increasing the reliability of the first fuse hole 25 in view of its functionality as a fuse without considerably degrading the strengthening capability of the first fuse protrusion 226.

Although the present invention has been described with reference to some exemplary embodiments, the foregoing disclosure should be interpreted as illustrative only, and it should be understood that various modifications and equivalent embodiments can be made by those skilled in the art without departing from the spirit and scope of the invention as set forth in the following claims.

What is claimed is:

1. A rechargeable battery comprising:
   an electrode assembly comprising a first electrode plate, a second electrode plate, and a separator between the first electrode plate and the second electrode plate;
   a case containing the electrode assembly; and
   a collector plate electrically connected to the first electrode plate, the collector plate having a fuse hole formed therein and including a fuse protrusion extending from a first side of the collector plate adjacent a first end of the fuse hole, a portion of the collector plate where the fuse hole is formed and including the fuse protrusion defining a fuse of the collector plate,
   wherein the collector plate comprises a connection part between the case and the electrode assembly, and an extension part coupled to and extending from the connection part at a corner portion, at least a portion of the extension part being coupled to the first electrode plate,
   wherein a width of at least a part of the extension part is greater than a width of the connection part, and
   wherein the connection part has a terminal hole formed therein, and the connection part is coupled to an electrode terminal at the terminal hole.

2. The rechargeable battery of claim 1, wherein the fuse protrusion is bent at an angle relative to a surface of the collector plate having the fuse hole formed therein.

3. The rechargeable battery of claim 1, wherein a cross-sectional area of the portion of the collector plate where the fuse hole is formed is smaller than that of other portions of the collector plate.

4. The rechargeable battery of claim 1, further comprising the electrode terminal electrically connected to the first electrode plate.

5. The rechargeable battery of claim 4, wherein the extension part extends from the connection part via the corner portion.

6. The rechargeable battery of claim 1, wherein the connection part comprises the portion of the collector plate where the fuse hole is formed.

7. The rechargeable battery of claim 1, wherein the extension part comprises the portion of the collector plate where the fuse hole is formed.

8. The rechargeable battery of claim 1, wherein the extension part extends substantially perpendicularly from the connection part to form the corner portion of the collector plate.

9. The rechargeable battery of claim 4, further comprising a cap assembly comprising a cap plate sealing an opening of the case, wherein at least one electrode terminal comprising the electrode terminal protrudes through a surface of the cap plate to the outside of the case.

10. The rechargeable battery of claim 9, wherein the fuse protrusion is bent relative to a surface of the collector plate having the fuse hole formed therein in a direction away from the surface of the cap plate.

11. A rechargeable battery comprising:
an electrode assembly comprising a first electrode plate, a second electrode plate, and a separator between the first electrode plate and the second electrode plate;
a case containing the electrode assembly;
a collector plate electrically connected to the first electrode plate, the collector plate having a fuse hole formed therein and including a fuse protrusion extending from a first side of the collector plate adjacent a first end of the fuse hole, a portion of the collector plate where the fuse hole is formed defining a fuse of the collector plate;
an electrode terminal electrically connected to the first electrode plate; and
a cap assembly comprising a cap plate sealing an opening of the case, wherein at least one electrode terminal comprising the electrode terminal protrudes through a surface of the cap plate to the outside of the case,
wherein the collector plate comprises a connection part between the case and the electrode assembly, and an extension part coupled to and extending from the connection part at a corner portion, at least a portion of the extension part being coupled to the first electrode plate,
wherein a width of at least a part of the extension part is greater than a width of the connection part, and
wherein the fuse protrusion is bent relative to a surface of the collector plate having the fuse hole formed therein in a direction toward the surface of the cap plate.

12. The rechargeable battery of claim 4,
wherein the electrode terminal is a first electrode terminal, and the rechargeable battery further comprises a second electrode terminal electrically connected to the second electrode plate, and
wherein the collector plate is a first collector plate, the fuse hole is a first fuse hole, the fuse protrusion is a first fuse protrusion, and the rechargeable battery further comprises a second collector plate coupled between and electrically connecting the second electrode plate and the second electrode terminal, the second collector plate having a second fuse hole formed therein and including a second fuse protrusion extending from a side of the second collector plate adjacent the second fuse hole, a portion of the second collector plate where the second fuse hole is formed defining a fuse of the second collector plate.

13. The rechargeable battery of claim 1, wherein the collector plate further includes another fuse protrusion extending from a second side of the collector plate adjacent a second end of the fuse hole opposite the first end.

14. The rechargeable battery of claim 1, wherein the fuse hole is elongated in a widthwise direction extending toward the fuse protrusion.

15. The rechargeable battery of claim 1, wherein a distance between the first end of the fuse hole and the first side of the fuse portion from which the fuse protrusion extends is about 1 mm to about 5 mm.

16. The rechargeable battery of claim 1, wherein the fuse protrusion has a groove formed at a side thereof.

17. The rechargeable battery of claim 1, wherein the width of the at least a part of the extension part is greater than a width of the connection part at an end of the connection part opposite the corner portion.

* * * * *